United States Patent [19]

Hillstrom et al.

[11] Patent Number: 4,464,604
[45] Date of Patent: Aug. 7, 1984

[54] TRACTOR WORK LIGHTING WITH AUTOMATIC DELUMINIZING CONTROL

[75] Inventors: Thomas P. Hillstrom, Clarendon Hills; Robert J. Wilson, Oswego; John T. Corwith, Naperville, all of Ill.

[73] Assignee: International Harvester Co., Chicago, Ill.

[21] Appl. No.: 397,706

[22] Filed: Jul. 13, 1982

[51] Int. Cl.³ .............................................. B60Q 1/26
[52] U.S. Cl. ...................................... 315/79; 315/77; 315/82; 315/83
[58] Field of Search ........................ 315/77, 79, 82, 83

[56] References Cited

U.S. PATENT DOCUMENTS 2,932,769  4/1960  Van Every et al. .................. 315/79
3,497,708  2/1970  Daugherty ............................ 315/79

*Primary Examiner*—Harold Dixon
*Attorney, Agent, or Firm*—Boris Parad; F. David Au Buchon

[57] ABSTRACT

Tractor with speed-responsive circuit-interrupting switch for automatically dousing, at night, flood work lamps provided in a lighting circuit on the tractor. Switching is controlled according to a microcomputer chip program by which frequency of a ground speed transducer is compared with the speed limit speeds pre-assigned to an intermediate tractor speed range; thus deluminizing occurs, necessarily on the highest side, at one speed commonly associated with highway rate of travel whereas, on the lower side, the switching effective to reconnect and relight the lamps is at a materially different desired speed of the tractor.

8 Claims, 4 Drawing Figures

U.S. Patent  Aug. 7, 1984  Sheet 1 of 2  4,464,604
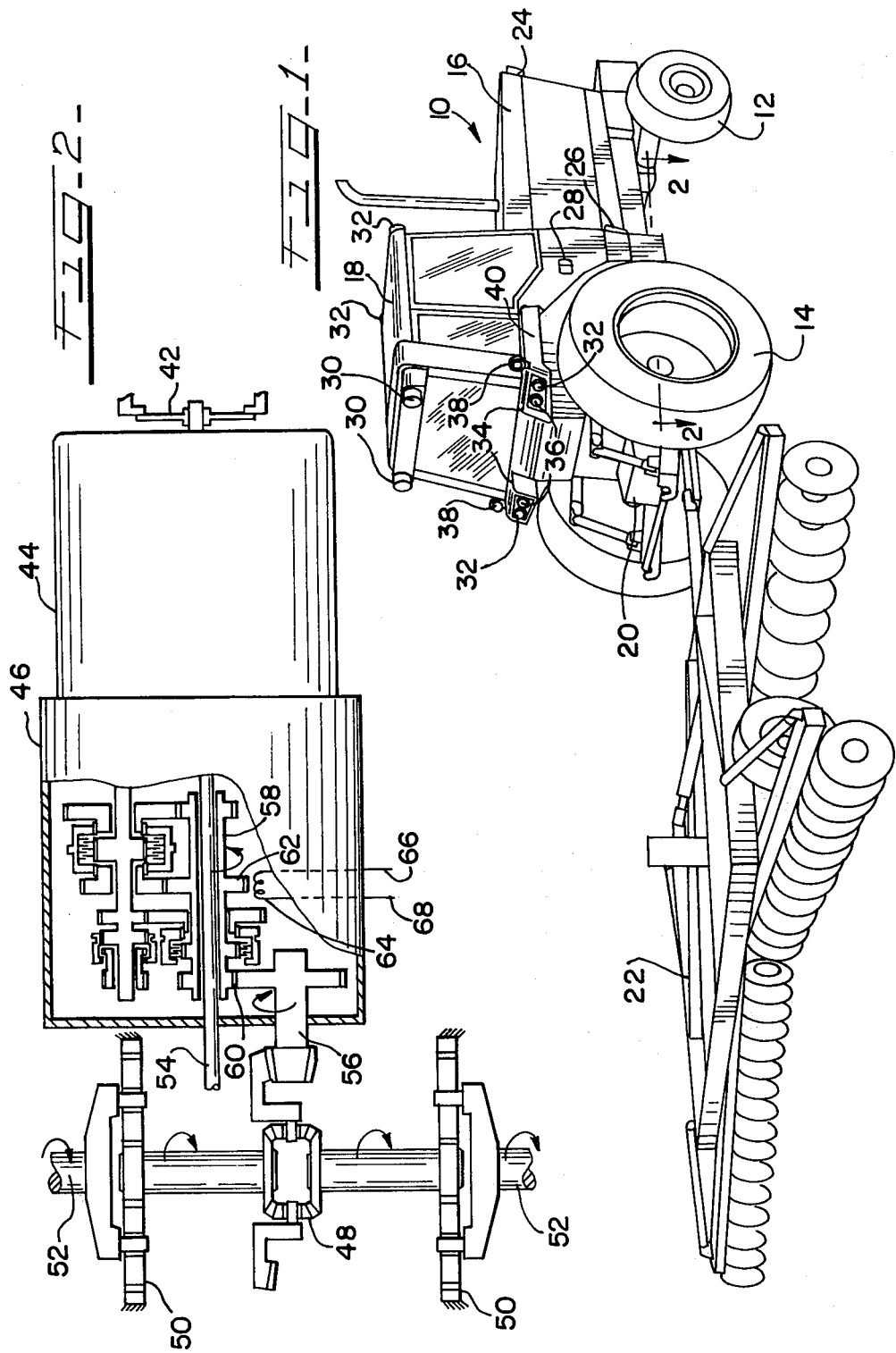

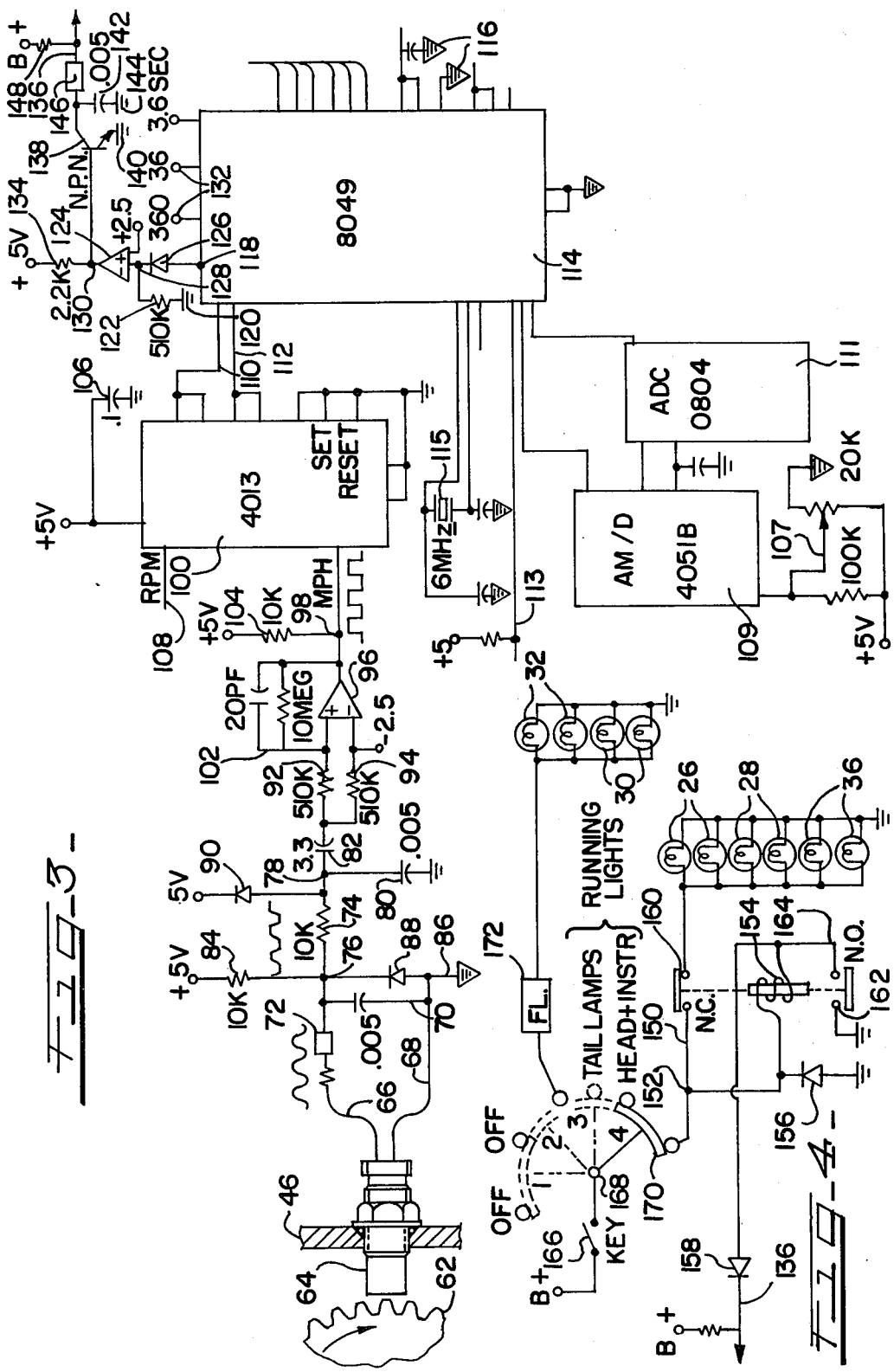

TRACTOR WORK LIGHTING WITH AUTOMATIC DELUMINIZING CONTROL

The white work lighting on a tractor provides the illumination for field work at night, such illumination as is necessarily supplemented by the customary head lamps provided on the tractor.

The present deluminizing control invention, relying on constantly monitoring tractor speed as the control parameter, therefore automatically senses highway speeds when attained by the tractor and, in response, selectively extinguishes the work lighting which is no longer necessary and yet continues to keep the head lamps burning to illuminate highway as the progress continues therealong.

In order that a high-low speed signal can be made available for the light-switching necessary, an entire intermediate tractor speed range is required to be monitored, the upper limit (e.g., 12 m.p.h.) of which is selected so as to be a transition speed somewhere between field speed and road speed during the usual tractor operation. The lower limit of this rather large speed range to be monitored is closer to but still higher than field operating speeds for the vehicle. A digital microprocessor chip employed for assistance in precise signal generation in accordance with our invention affords this wide speed range monitoring versatility, which the ordinary logic circuit would find difficult to cope with. That is to say, it is singularly the chip which lends itself to letting us program-in a large hysteresis such that the tractor, once it turns off the work lamps at 12 m.p.h., can then decelerate into the noted speed range and therebelow without turning the work lamps back on again.

More particularly we provide, in addition to a pre-programmed microcomputer chip, a source-connected multiposition selector switch which the driver positions to selectively illuminate the vehicle with both the field work lamps and head lamps jointly energized, so switched as to be hereinafter called the common selector switch position, or else he switches by exclusively selecting the head lamps and other lamps so that the work lamps are meantime deluminized.

Additionally, we provide for keeping the work lamps deluminized even when the selector switch occupies the common position, at all times as soon as and after a vehicle speed of twelve miles per hour is reached.

Finally, we provide for, according to the microcomputer programming in accordance with our invention, the re-illumination of the work lamps by the vehicle driver when he repositions the selector switch to its common position, only after he has removed it from that common position beforehand and only after the vehicle is operating at or below eight miles per hour. Then and thereafter, the work lamps will continue burning at all speeds below twelve miles per hour.

Thus what our invention ensures to the driver when he detects the field lamps being automatically deluminized on the highway is that he must immediately change the selector switch to its exclusive position for head lamps and other running lamps of the vehicle, and further ensures to the driver when he is unable to re-energize the work lamps that he must first be driving at a field speed of eight miles per hour or below, before the selector switch in re-taking its common position is permitted by the microprocessor to re-energize the work lamps.

So no matter how long the vehicle operates on the highway below eight miles per hour, the killed work lamp circuit will not change its status until the driver intervenes.

Various features, objects and advantages of the vehicle lighting system provided according to our invention will either be specifically pointed out or become apparent when for a better understanding thereof, reference is made to the following description taken in conjunction with the accompanying drawings which show a preferred embodiment thereof and in which:

FIG. 1 is a showing, in right rear, three quarters, perspective view, of a work-equipped farm tractor embodying the present automatic deluminizing work lighting control;

FIG. 2 is a showing, in top plan partly sectionalized, of the portion of the power train at the rear of the tractor as taken along the section lines II—II appearing in FIG. 1; and FIGS. 3 and 4 are schematic diagrams of the respective electrical deluminizing control circuit and electrical lamp circuit as provided on the tractor of FIG. 1.

More particularly, a farm tractor 10 is shown in FIG. 1 having row-crop-spaced front wheels 12 and rear wheels 14 and including a front mounted engine enclosure 16 and a mid-mounted cab 18 for the driver.

At the rear, a conventional hitch 20 connects the tractor to a drawn ground tillage implement illustrated as a disc harrow 22. For night work, the driver requires illumination front and rear to see where he is going and what the implement is accomplishing behind him.

On the highway, the usual head lamps 24 located in a grille, not shown, at the front of the engine enclosure 16, do not require assistance in forward lighting. However, in the field at night, a pair of rectangular front flood lamps 26 located in the bottom front of the cab 18 supplements the illumination of the head lamps 24 for a close-by light pattern on the furrows. In one physically constructed embodiment of the invention, a pair of auxiliary halogen flood work lamps 28 was also provided, located in the sides of the tractor cab 18 for auxiliary forward illumination of the furrows.

By way of brief return to highway adaptation, two amber flashing lamps 30 are provided at the top rear of the cab 18 for day time and night time use and two counterpart amber flashing front lamps 32 are provided at the forward end of the cab at its top. Further for night highway use, two red tail lamps 32 are provided in rear housings 34.

In one physically constructed embodiment of the invention, and sharing the same housings 34, two rear trapezoidal pattern work lights are provided at the inner lamp location 36 to illuminate the drawn implement 22. Optional flood work lamps 38 can also be supplied if desired located on fenders 40 which extend from the rear portion of the cab 18 at it sides.

In the engine enclosure 16, an engine, not shown, drives a flex plate and damper and a power train now to be briefly described.

POWER TRAIN—FIG. 2

An engine driven flex plate and damper 42 operates in this figure to drive, through a tandem connected speed transmission box 44 and a range transmission box 46, in that order, a differential 48 which, through a final planetary drive 50 at each side of the tractor, drives the rear wheels 14, not shown, through rear axles 52 on the tractor.

A power take off shaft 54 and a differential pinion driving output shaft 56 extend through the rear of the range transmission box 46. A gear carrying final countershaft 58 in box 46 is hollow for receiving the power take off shaft 54 and includes a pinion connection 60 to the range transmission output shaft 56 so as to maintain a speed constantly proportional to output shaft speed and hence constantly proportional to tractor rear wheel speed. One of the mentioned gears, indicated at 62, carried by the final countershaft 58 has a peripheral tooth portion open for access so as to rotate in closely spaced relationship past a transducer head 64 fixed in the box 46 and served by a pair of lead wires 66 and 68.

The transducer supplied frequencies through leads 66 and 68 are directly proportional to tractor ground speed, and in known way can be applied to appropriate circuit timers, counters, and registers to yield speedometer or tachometer readings after the manner generally as taught in U.S. Pat. Nos. 4,268,792 and 4,281,388.

One preferred form of such speedometer circuit is illustrated in the figure now to be described.

SPEEDOMETER AND CHIP CIRCUIT—FIG. 3

The transducer leads 66 and 68, just described, include therein a pi filter comprising an R-C network 70 supplemented by a ferrite bead 72 to eliminate transient voltage noise or other electromagnetic interference with the essentially sine wave voltage signal indicated in the figure being generated in the leads at the frequency sensed by the transducer 64.

A 10K resistor 74 couples the signal from a junction 76 of transducer lead 66 to an inter-capacitor junction 78 between a pair of capacitors 80 and 82. Another 10K resistor 84 connects the lead junction 76 to the terminal of a linear voltage regulator marked by the indication of its terminal voltage +5 V.

The other transducer lead 68 terminates in respective connections one at 86 made directly to an analog ground and one made to the junction 76 at the input end of coupling resistor 74 by means of a clamping diode 88; the clamping diode 88 clamps the voltage at junction 76 by clipping off the valley part of the bottom half of the transducer frequency waves. At the output end of the coupling resistor 74, another clamping diode 90 provides an interconnection to the regular power supply marked 5 V; the diode 90 clamps the voltage at junction 76 by clipping off the tops of the peaks of the transducer frequency waves to create the wave illustrated in that vicinity.

By attenuating high frequency noise, the pair of capacitors 80 and 82 perform low pass filtering and AC coupling of the peak clipped signal to the common end terminal of two 510K resistors 92 and 94.

A comparator 96 operates with stability in supplying its output to a junction 98 connected to the input of an integrated flip-flop circuit 100. So for noise immunity for the comparator 96 to prevent it from oscillating around one voltage, the resistor 92 is connected to the + terminal of the comparator and the resistor 94 is connected to the − terminal of the comparator 96 thereby to provide the hysteresis necessary for the comparator readily to switch between the two different levels of high voltage and low voltage in output applied to the junction 98. Similarly, an R-C network 102 is connected in appropriate manner between the resistor 92 input to the comparator 96 and the output of the comparator 96 to introduce more hysteresis of comparator operation, that is, well-defined two level hysteresis.

The linear voltage regulator previously referred to has a terminal marked +5 V which is connected by a 10K resistor 104 to the comparator output junction 98, and a similar terminal thereof marked +5 V also supplies the flip-flop 100, stabilized by a capacitor 106 having one plate grounded to a digital ground.

The output at junction 98 is the square wave illustrated which in one physically constructed embodiment of the invention range in frequency from 10 Hz to 7,000 Hz and which has digital form for use in computing ground speed in miles per hour. By a somewhat similar circuit, a wave is generated and introduced to the flip-flop at 108 which has a frequency proportional to engine revolutions and is ultimately employed as a square wave for computing engine rpm's.

The integrated flip-flop 100 in one physically constructed embodiment of the invention had a component designation 4013, readily commercially obtainable.

The separate mph and rpm inputs to the flip-flop 100 require the respective two separate output connections 110 and 112 therefrom to a digital microcomputer chip 114 for handling the microprocessing of the voltage frequency waves. The purpose of the intervening flip-flop 100 is to provide greater resolution by the microcomputer in handling the sensed edge of each pulse, and the flip-flop circuit actually divides the pulse frequency by two before passing it on to the microcomputer.

In regard to software for chip 114, the programmed intermediate speed range later to be described therefor is a function not only of tractor axle revolutions per minute but also the radius of the rubber tires at the rear of the tractor vehicle. So a potentiometer circuit 107 is provided connected through an analog multiplexer/demultiplexer 109 and an analog to digital converter 111 to the chip 114 for adjusting the later described programmed intermediate speed range up and down according to such program depending upon the rubber tire radius specified for the vehicle. The threshold range or speed band to cover those intermediate speeds is made rather wide, introducing considerable hysteresis to prevent speed hunting in the system.

A commercially procured component 4051B when provided at 109 and a commercially procured component 0804 at 111 have been found to perform satisfactorily in conjunction with and between the potentiometer circuit 107 and the chip 114.

Precise timing in the timing circuits is fundamental to the chip in measuring frequency of the pulses as an accurate determination of tractor speed. One of the timer input circuits is indicated at 113 for chip 114 and, for proper stability of its operation and timing, a 6 MHz crystal oscillator 115 with appropriate capacitance and analog ground connections is connected to the chip for frequency regulation. Power input to chip 114 is omitted from the drawing.

The number of times a gear tooth passes a transducer per revolution of the tractor drive axle is a known constant for every vehicle type. This constant is stored in a read-only memory provided in association with and used by the chip 114 as program memory. The number of feet or meters covered by the tractor per axle revolution is as already indicated a function of the radius of the tires carried by the wheels on the drive axle. The tire radius of each vehicle is known and is programmed according to the vehicle concerned into the digital microcomputer chip 114 by an appropriate slider adjustment made manually in the potentiometer circuit 107. A relatively small tire radius is compensated for by increasing the length of the timed intervals so that impulses sensed per interval appropriately decrease indicative of decreased speed. The larger the tire radius becomes causes the length of each timed interval to be shortened.

The chip 114 is a commercially procured Intel 8049 or National 8049 micro P chip.

The chip 114, in addition to further analog grounds thereof as indicated at 116, has a groundable output pin 118 internally digitally groundable by the chip and also has an adjacent digital ground 120 for use in conjunction with an associated 510K bias resistor 122.

More particularly, the output pin 118 is connected to the negative terminal of a comparator 124 through a voltage-spike-protecting diode 126 and a junction 128 leading to the ungrounded end of the bias resistor 122. The positive terminal of comparator 124 is connected to a battery terminal indicated as +2.5 in the illustration. The comparator output present at a junction 130 varies in three ways.

First, if the voltage of the terminal of the battery goes-much below the +2.5 value referred to, the output as measured at junction 130 will go low corresponding to a shut down.

Second, if the pin 118 remains ungrounded to its internal digital ground within the chip 114, the biasing resistor 122 connected to the − terminal will bias the comparator 124 to a low output corresponding to shut down.

Finally, if the pin 118 is internally grounded by operation of the chip 114 so as to clamp the voltage of junction 128 to ground, the comparator 124 will respond with a high output of activation.

Such activation or shut down to the extent that it is controlled by the chip 114 depends upon counting the frequency of impulses in the connection 112 to the chip, utilizing them in junction with a timer and with a register, and internally comparing them with pre-established programmed standards as known in the microprocessor art. The sensed frequency controls.

Various of the timer connections elsewise utilized are indicated at 132.

A resistor 134 connects the previously discussed linear voltage regulator terminal and the output junction 130 of the comparator 124 and the chip 114.

The output at junction 130 controls a solenoid circuit 136 through high-low speed switching signals afforded from an n-p-n transistor 138. The emitter of the transistor has a digital ground at 140 and a smoothing capacitor 142 for the collector of the transistor has a digital ground at 144. When the transistor 138 conducts through an anti-noise ferrite bead 146, the effect is that the transistor closes or completes the solenoid circuit 136 and it does so only as result from a positive voltage being applied to the base electrode of the transistor 138. That positive voltage is supplied from output junction 130 of the comparator 124. Low comparator output on the other hand, i.e., the voltage goes low, causes the transistor 138 to cease conducting, whereupon the solenoid circuit 136 in held in inactive status by a bring-up resistor 148 connected between that circuit and full B+ battery voltage.

In one physically constructed embodiment of the invention, the programming of the chip 114 was such as to compare the current tractor ground speed to the respective upper and lower limits of a rather large intermediate tractor speed range already referred to. The band width imparts stability to the system. The upper limit, 12 mph or 19 kilometers per hour, was selected so as to be considerably higher than any speed desirable for field operation of the tractor but lower than any usual highway transport speed.

The lower speed limit, assigned as 8 mph or 13 kilometers per hour, is outside of the usual field work speeds.

The internally digitally grounded, low speed signal effect at chip pin 118 (goes less positive) will occur upon tractor acceleration to 12 mph so that then and thereafter, within said intermediate speed range and anywhere above it, the transistor 138 will bE positive biased into the effective switch closed position, for operating the solenoid circuit 136 with the energizing signal to the solenoid.

The ungrounded output signal effect of pin 118 (goes more positive) on chip 114 will always occur when the tractor decelerates to a low speed of 8 mph, resulting in a counter signal cutting off the high-speed signal and in the transistor 138 being reduced to its open-switch low speed signal condition which then and thereafter, while the tractor is in the intermediate speed range or below it, will be attended by the solenoid circuit 136 being unactuable between power supply and ground.

The interrelationship of the solenoid circuit and tractor lamps will now be explained.

SOLENOID CIRCUIT AND LAMP CIRCUIT—FIG. 4

A first lamp circuit 150 has a junction 152 in common with the solenoid circuit 136 as shown in this figure so as to be connected electrically in parallel with the latter. The first circuit 150 includes all work lamps 26, 28, and 36 connected therein electrically in parallel.

The solenoid circuit 136, in addition to including a solenoid 154, has a grounded diode 156 connected to the battery side thereof and another diode 158 connected on the other side thereof, both diodes to protect more delicate components in that circuit from electromagnetic interference due to reverse voltage surges.

The solenoid 154 operates a set of normally closed work light interrupting upper contacts 160 in the first circuit 150 and a normally open set of lower contacts 162 in a ground-connected relay latching circuit 164, all electromagnetically operated.

Current to the common junction 152 is supplied from the B+ storage battery terminal through an ignition key switch 166 and a four-position light selector switch 168 in series therewith. The contact wiper 170 of the light switch 168 moves from a position 1 as shown in broken lines which is the switch-off position, to a position 2 applying B+ voltage to only the amber warning lamps 30 and 32 through a periodic circuit interrupting flasher element 172, thence to a position 3 operating the flashing amber warning lamps and the instrument illuminating lamps on the tractor plus the running lights consisting of tail lamps and head lamps, not shown, and finally to the position 4 illustrated in solid lines in which the wiper applies B+ voltage to the head and instrument lamps and simultaneously to the first circuit 150 and solenoid circuit 136.

The overall operating conditions and possibilities will now be explained, with particular reference to FIG. 4.

POSITION 4, SPEED RANGE SPEED AND BELOW

With chip pin 118 open circuited because of the relatively low frequency output of the speed transducer, the transistor 138 is cut off, preventing the solenoid circuit 136 from being completed. So the normally closed inactivated relay contacts 160 conduct current from the selector switch wiper 170 and fully illuminate all work lamps 26, 28 and 36 in the first circuit 150. Also the wiper 170 in position 4 of the selector switch lights the head lamps and instrument lamps on the tractor.

Conditions are therefore appropriate and consistent with night tillage or other tool work of tractor 10, not shown in FIG. 4, in the field.

POSITION 4, INTERMEDIATE SPEED RANGE AND ABOVE

Upon tractor acceleration to twelve miles per hour, the chip 114 electronically internally grounds pin 118, forward biasing the n-p-n transistor 138 so as to start conducting and to energize relay solenoid 154. The latching contacts 162 thereupon automatically close and hold the relay in circuit, while the first circuit 150 is interrupted by the opened upper contacts 160, extinguishing the work lamps and circuit 150.

The work lamps under the conditions stated so far thereafter remain extinguished not only in the intermediate range being monitored and above, but also while the chip 114 is sensing speeds below eight miles per hour. That is to say, irrespective of the transistor 138 being rendered in open-switch condition below 8 mph or re-turned-on at 12 mph, the latching relay 154 in the solenoid circuit 136 holds itself in circuit, keeping the first circuit 150 and its work lamps de-energized.

SELECTOR SWITCHING, 8 mph

The work lamps in circuit 150 are relit only following two preliminary steps which must be accomplished. The two, which can be accomplished in either order or simultaneously with both steps, consist of the one step to hand switch the wiper 170 to any position other than position 4 and the other step to reduce tractor speed to eight miles per hour to render transistor 138 cut-off or electronically in open-switch condition. The relay solenoid 154, thus deenergized, thereupon prepares the first circuit 150 for operation by closing contacts 160 and at the same time places its latching circuit 164 in open-switch condition by lowering the thus opened, lower contact bridge at 162.

Then and thereafter the wiper of switch 168 is restored to the position 4 as shown in solid lines, completing the cycle by illuminating the work lamps 26, 28 and 36 and at the same time being accompanied by the solenoid 154 being open circuited all around.

From this status, with the lamps of circuit 150 remaining illuminated throughout the intermediate speed range and below, the cycle is then repeated by reaccelerating the tractor to 12 mph.

In an interrupted type sequence which is commonly encountered, the driver upon accelerating past 12 mph up to his selected highway speed, will upon noticing the automatic turn-off of the work lamps reset the selector switch 168 to position 3 for night highway operation; that is, besides the head lamps 24 and instrument lamps continuing to burn, the switch 168 will light the tail lamps 32 and also activate the amber flashing warning lamps 32 and 30.

Upon returning to a field and reducing the tractor progress down to field work speed, the driver will realize he is at eight miles per hour or below and restore the switch 168 to position 4 for securing the amber and tail lamp circuits from operation and relighting all work lamps.

The foregoing makes it apparent that this system builds in a safeguard against the tractor inadvertently or unwantedly keeping lit or re-lighting its white work lamps when out on the road. The final, and only, step effective to re-illuminate work lamps requires the driver's conscious effort to reset the switch to its appropriate position for the work lamp selector setting. And a preceding effort to that effort, making him conscious of the necessity of the latter, is the necessary effort by the driver to reduce the tractor speed to eight miles per hour or below.

So automatic switch-on action by the chip system hereof never intervenes on the highway, unless so willed by the driver, at any speed below or above the intermediate speed range or in that range. The reason is the electromagnetic lock effect of the latching relay solenoid 154 in locking its upper set of contacts 160 open irrespective of vehicle speed decreases below the 12 mph upper limit of the intermediate tractor speed range. And, as noted, the circuit interlock requires a conscious disabling act by the driver before it will unlock. The unlocking at 170 and the locking at 138 of that interlock imparts to the first 150 and solenoid 136 circuits the mutually exclusive operation of only one circuit operating at a time while the other at that time is inherently open-circuited.

Variations within the spirit and scope of the invention described are equally comprehended by the foregoing description.

What is claimed is:

1. Apparatus for controlling the energization, from a power supply, of flood lamps on a vehicle in dependence upon its speed comprising:

a selector switch connected to the power supply;

a set of flood lamps;

a lamp circuit connected in series with the switch and connecting the flood lamps between the switch and ground for lighting the lamps from the power supply;

a solenoid;

a shunt circuit connected to the switch so as to be shunt-connected thereby to the lamp circuit and connecting the solenoid in series between the switch and ground, said solenoid having first and second sets of switch contacts, the first of which is connected in the lamp circuit in series therewith and operative to open when the solenoid is energized; and means responsive to high vehicle speed to generate and apply a high speed signal to energize the solenoid and operate its switch contacts, thereby open circuiting the lamp circuit and extinguishing the set of flood lamps;

the second set of solenoid switch contacts operative to close when the solenoid energizes and comprising holding circuit contacts connected in the shunt circuit in series therewith so as to afford to the solenoid upon energization the characteristic of a latching relay to hold itself in said shunt circuit, and to keep the vehicle flood lamps extinguished despite subsequent continuance or discontinuance of a high speed signal thereafter.

2. The invention according to claim 1, further comprising:
a set of running lamps for the vehicle; and
a running lamp circuit connected to the selector switch so as to connect the set of running lamps in series between the selector switch and ground for lighting the lamps from the power supply;
said selector switch in common to the flood and running lamp and shunt circuits having connection to same simultaneously in a common switch position of the selector switch and, once unswitched therefrom into a selective position, operating to deenergize the solenoid and re-operate its sets of switch contacts, and to operate the running lamps from the power supply.

3. The invention according to claim 2, the re-operation by the deenergized solenoid of the solenoid switch contacts in their respective circuits characterized by:
the first set of switch contacts closing to prepare the flood lamp circuit for re-operation immediately the selector switch switches to the common position aforesaid whereas the second set of switch contacts opens disabling the shunt circuit in prevention of the switch, by switching into common position, thereby re-energizing the solenoid.

4. Lighting system for a multi-speed, rubber-tire, tractor vehicle having a supply of electric power comprising:
a power supply connected switch (168);
a set of flood lamps (26,28,36);
a lamp circuit (150) connected in series with the switch and connecting the set of flood lamps between the switch and ground for operating the lamps from the power supply;
a solenoid (154);
a shunt circuit (164) connected to the switch so as to be shunt-connected thereby to the lamp circuit and connecting the solenoid in series between the switch and ground, said solenoid having sets of switch contacts, one connected in the lamp circuit in series therewith for operation when the solenoid energizes and operative to open, open circuiting the circuit to the power supply and extinguishing the flood lamps; and
signal generating and applying means comprising a transistor (138) having speed responsive digital microcomputer chip controlling means therefor (114) and effective in a transistor turned-on status to apply a signal energizing the solenoid and effective, when controlled to cut-off, thereby to turn off the energizing signal to the solenoid;
said transistor speed responsive controlling means programmed for and comparatively sensing high-low vehicle speeds responded to thereby, causing respective high-low signals applied by the transistor to the solenoid so as to initiate a corresponding state of energization or not in the solenoid to extinguish the lamp circuit or not.

5. The invention of claim 4, further comprising:
further responsive means (124) connected to the transistor speed responsive controlling means to cut off the transistor resulting in the signal being low and not energizing the solenoid, in response to loss of power supply potential to a low voltage level.

6. The invention of claim 4, additionally comprising:
adjustment means (107) connected to the transistor speed responsive controlling means for adjusting the programmed high-low speeds in the digital microcomputer chip means to compensate for the magnitude of the rubber tire radius of the vehicle.

7. Lighting system for a tractor vehicle having a supply of electric power comprising:
a power supply connected switch (168);
a set of work lamps (26,28,36);
a lamp circuit (150) connected in series with the switch and connecting the work lamps between the switch and ground for operating the lamps from the power supply;
a solenoid (154);
a shunt circuit (164) connected to the switch so as to be shunt-connected thereby to the lamp circuit and connecting the solenoid in series between the switch and ground, said solenoid having first and second sets of switch contacts, the first of which is connected in the lamp circuit in series therewith and operative to open when the solenoid is energized; and
means (124,138) responsive to vehicle speed, productive of a high-low speed signal which turns on or off to respectively energize or not energize the solenoid which, when so energized, operates its switch contacts thereby open circuiting the lamp circuit (150) and extinguishing the set of work lamps;
said power supply connected switch (168) in common to the work lamp and shunt circuits (150,164) connecting the power supply thereto in a common switched position (position 4) of the switch and, once unswitched therefrom into another position (position 3), operating to extinguish the set of work lamps;
said power supply connected switch in said other position (position 3) thereof, and said speed responsive means in its condition characterized by the turned-off speed signal, being cooperative in each one's not energizing the solenoid whereby its first set of solenoid contacts, as re-set closed thereby, prepares the lamp circuit (150) for completion by the power supply connected switch immediately it resumes the common switched position (position 4).

8. Automatic mode to apply high-low speed signals to control lighting equipment for a tractor operating at different running speeds and having a source of power supply, said lighting equipment comprising a selector switch connected to the power supply, a set of flood lamps, a circuit connected in series with the switch and connecting the set of flood lamps between the switch and ground for operating the lamps from the power supply, a solenoid, a shunt circuit connected to the switch so as to be shunt-connected thereby to the circuit of lamps and connecting the solenoid in series between the switch and ground, said solenoid having first and second sets of switch contacts, the first of which is connected in the circuit of lamps in series therewith for operation when the solenoid is energized and operative to open thereupon, open circuiting the circuit of lamps to the power supply and extinguishing the flood lamps, and high-low speed signal generating and applying means comprising a transistor having a speed responsive microchip controlling same, the second set of solenoid switch contacts operative to close when the solenoid energizes and comprising holding circuit contacts connected in the shunt circuit in series therewith so as to afford to the solenoid upon energization the characteristic of a latching relay to hold itself in said shunt circuit, said selector switch in common to the shunt and lamp circuits connecting the power supply thereto in a common switched position and, once unswitched therefrom into another position, operating to extinguish the set of flood lamps, said solenoid responsive to the generation and application of a high speed signal to the solenoid, to energize and operate its sets of contacts, comprising the steps of:

generating in the microchip and transistor and applying therefrom to the solenoid a low speed counter signal removing the high speed signal for thereby withholding energizing by the high speed signal so as to afford deenergization;

connecting the power supply through the common switch to the solenoid circuit and to the circuit of lamps to light the latter;

thereafter generating in the microchip and transistor and applying therefrom to the solenoid the high speed signal energizing the solenoid so as to close the second set of solenoid holding contacts in the shunt circuit and so as to open the first set extinguishing the circuit of lamps; and finally, generating in the microchip and transistor and applying therefrom to the solenoid the low speed counter signal, said closed second set of solenoid holding contacts insuring extinguished lamps by affording continued power supply energization of the solenoid despite the counter signal of the microchip and transistor to the solenoid to deenergize.

* * * * *